(12) United States Patent
Byerly

(10) Patent No.: US 7,615,718 B2
(45) Date of Patent: Nov. 10, 2009

(54) APPARATUS AND METHOD FOR SUPPLYING A CONTINUOUS SOURCE OF WIRE

(75) Inventor: Steven M. Byerly, Cincinnati, OH (US)

(73) Assignee: Toyota Moto Engineering & Manufacturing North America, Inc., Erlanger, KY (US)

(*) Notice: Subject to any disclaimer, the term of this patent is extended or adjusted under 35 U.S.C. 154(b) by 616 days.

(21) Appl. No.: 11/397,276

(22) Filed: Apr. 4, 2006

(65) Prior Publication Data

US 2006/0180578 A1 Aug. 17, 2006

Related U.S. Application Data

(63) Continuation-in-part of application No. 10/448,897, filed on May 30, 2003, now Pat. No. 7,041,932.

(51) Int. Cl.
*B23K 11/00* (2006.01)
(52) U.S. Cl. .......................................... 219/58; 219/56
(58) Field of Classification Search .................. 219/56, 219/56.1, 56.22, 57, 58
See application file for complete search history.

(56) References Cited

U.S. PATENT DOCUMENTS

| | | | |
|---|---|---|---|
| 986,020 A | 3/1911 | Mills | |
| 1,955,805 A | 4/1934 | Hanson | |
| 1,966,532 A | 7/1934 | Williams | |
| 2,244,554 A | 6/1941 | Hannaford | |
| 2,556,160 A | 6/1951 | Ayers | |
| 2,774,548 A | 12/1956 | Hanson | |
| 3,011,255 A | 12/1961 | Washburn et al. | |
| 3,101,916 A | 8/1963 | Haugwitz | |
| 3,112,899 A | 12/1963 | Hosbein | |
| 3,167,857 A | 2/1965 | Saito et al. | |
| 3,259,969 A | 7/1966 | Tessmann | |
| 3,621,176 A | 11/1971 | Valente | |
| 3,696,228 A | 10/1972 | Thomas, Jr. et al. | |
| 3,815,844 A | 6/1974 | Wright et al. | |
| 3,828,601 A * | 8/1974 | Tessmann | 72/334 |
| 3,863,861 A | 2/1975 | Bellasio | |
| 3,912,900 A * | 10/1975 | Arnett | 219/56.21 |
| 3,934,784 A | 1/1976 | Tessmann | |
| 4,111,380 A | 9/1978 | Heuckroth | |
| 4,153,214 A | 5/1979 | Savio et al. | |
| 4,222,535 A | 9/1980 | Hosbein | |
| 4,269,344 A | 5/1981 | Vervliet | |
| 4,308,446 A | 12/1981 | Okane et al. | |
| 4,396,168 A | 8/1983 | Hilt et al. | |
| 4,623,777 A | 11/1986 | Aihara et al. | |
| 4,657,204 A | 4/1987 | Colbert | |

(Continued)

FOREIGN PATENT DOCUMENTS

EP   1 526 586 A2   10/2004

*Primary Examiner*—Kevin P Kerns
(74) *Attorney, Agent, or Firm*—Dinsmore & Shohl LLP

(57) ABSTRACT

Welding systems and methods include a welding unit for joining a first and a second source of wire, in which the welding unit includes a wire feed tunnel defining a travel path through the welding unit for the first and second sources of wire. The welding unit further includes a pair of wire feed ports disposed on opposite ends of the wire feed tunnel, and a wire joining zone disposed along a portion of the feed tunnel and configured to weld together an end of the first wire source to an end of the second wire source by applying weld heat to at least part of the respective ends of the first and second wire sources. The welding unit also includes a switch configured to adjust the inner diameter of the wire feed tunnel until the inner diameter is substantially the same as the exterior diameter of the first and/or second sources of wire.

20 Claims, 8 Drawing Sheets

U.S. PATENT DOCUMENTS

| | | |
|---|---|---|
| 5,277,314 A | 1/1994 | Cooper et al. |
| 5,971,308 A | 10/1999 | Boulton |
| 6,127,652 A | 10/2000 | Becherucci et al. |
| 7,041,932 B2 * | 5/2006 | Byerly et al. ............ 219/58 |

* cited by examiner

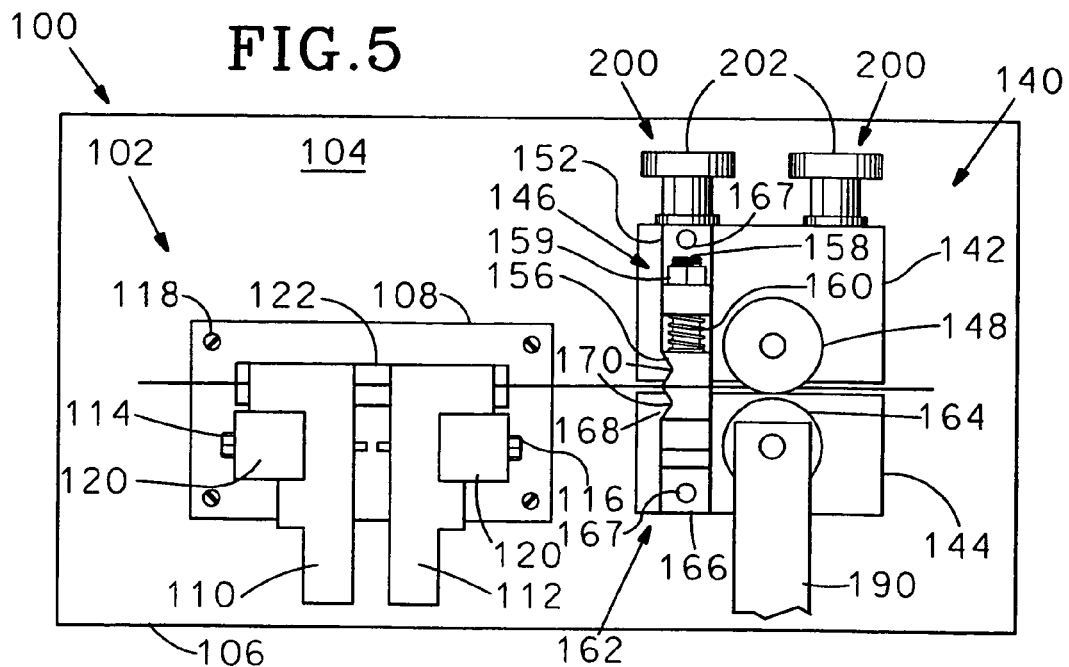
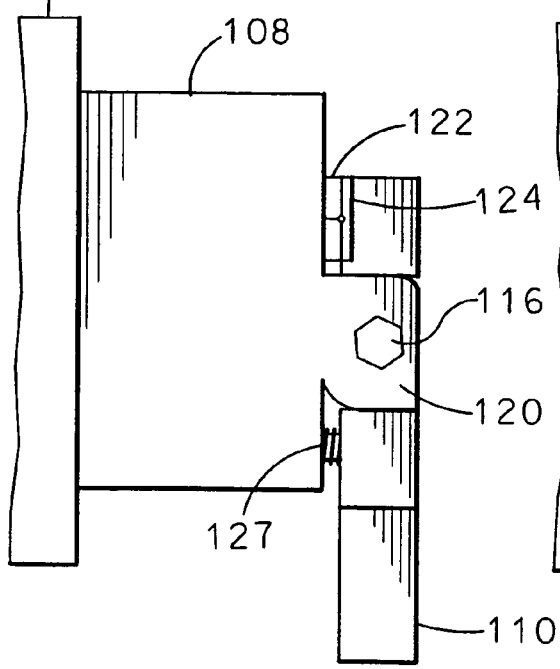 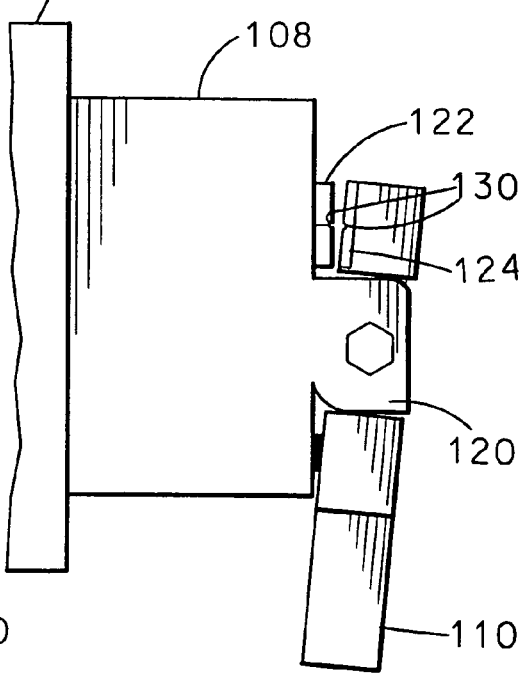

APPARATUS AND METHOD FOR SUPPLYING A CONTINUOUS SOURCE OF WIRE

CROSS REFERENCE TO RELATED APPLICATIONS

This application is a continuation-in-part of U.S. application Ser. No. 10/448,897 filed May 30, 2003, now issued as U.S. Pat. No. 7,041,932, the entire disclosure of which is incorporated herein by reference.

FIELD OF THE INVENTION

This invention relates to an apparatus and method for supplying a continuous source of wire from finite sources. More particularly, this invention relates to an apparatus and method for joining, reducing and supplying wire from successive sources so that a continuous source of wire may be provided and utilized.

BACKGROUND OF THE INVENTION

There are many manufacturing applications which require wire to be substantially continuously fed for a process or production. Generally, however, the source of such wire is finite, and must be replaced periodically. For example, the wire used in the automobile component welding process is often drawn from cylindrical barrels or similar supply rolls containing wire that is circularly packed within a source barrel. As used herein, the term "wire" encompasses relatively slender and often flexible thread or rods which can be made of metal, plastic or other material which can be connected together in a welding, fusing or similar process wherein the material flows together. One end of the wire is manually threaded into a feeder that draws the wire from the barrel and supplies the wire for component welding. A problem arises when the wire contained in the source barrel is exhausted. If the end of the wire completely runs through the wire feeding machine, then the technician must re-feed through the wire from a new or second barrel into the feeding machine resulting in costly downtime and labor costs. To solve this problem, it has been known to weld the ends of the wires from two or more barrels together to create a "never ending" source of wire. Such a process is known in the art as "butt welding".

An issue arises, however, with "butt welding" in that a spur or burr generally develops on the wire as a result of the weld and force applied between the two wires during the butt welding process. The spur often interferes with or prevents the feeding machine process as the increased diameter caused by the spur cannot enter the feeding machine. In the past, the technician would manually weld then cut or grind the spur so that the spur would not interfere with the feeding machine process. Manually cutting and grinding the spur is often time intensive and may not necessarily solve the problem of increased diameter of the wire. Heretofore, it has been known to feed the welded wire through a machine that automatically reduces the spur. However, such machines require a worker to remove a welded wire from the welding machine and insert the welded wire into the spur reducing machine. Not only is this process time intensive and inefficient, but it does not allow the worker to immediately inspect the wire and rerun the reducing process if needed.

Another issue arises with welding the ends of wires from two or more barrels in that non-working barrels of wire need to be manipulated and positioned one by one so that the feeding machine can effectively draw the wire once the working barrel is depleted. Such activity can be very strenuous, especially for barrels weighing upward of 500 lbs. (226.8 kg) or more.

As such, there is a desire for an apparatus configured to efficiently join, reduce and distribute wire from two or more manufacturing supplies thereby eliminating the aforementioned issues and to better facilitate an effectively continuous supply.

SUMMARY OF THE INVENTION

Accordingly, the present invention is intended to address and obviate problems and shortcomings and otherwise improve previous apparatuses and methods for joining, reducing and supplying a continuous source of wire.

In a first embodiment of the present invention, a welding unit for joining a first and a second source of wire is provided. The welding unit comprises a wire feed tunnel defining a travel path through the welding unit for the first and second sources of wire. The welding unit further comprises a pair of wire feed ports disposed on opposite ends of the wire feed tunnel, and a wire joining zone disposed along a portion of the feed tunnel. The wire joining zone is configured to weld together an end of the first wire source to an end of the second wire source by applying weld heat to at least part of the respective ends of the first and second wire sources. The welding unit also comprises a switch configured to adjust the inner diameter of the wire feed tunnel until the inner diameter is substantially the same as the exterior diameter of the first and/or second sources of wire.

In a second embodiment of the present invention, a method for joining a first welding wire and a second welding wire is provided. The method comprises feeding first and second welding wires into opposite ends of a wire feed tunnel in the direction of a wire joining zone, such that an end of the first wire contacts an end of the second wire in the wire joining zone. The method further comprises surrounding at least partially the ends of the first and second weld wires in the wire joining zone, and applying weld heat to the wire joining zone to weld together the ends of the first and second wires with substantially no burr being formed.

Still other embodiments, combinations, advantages and features of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 5 is a front elevational view of an exemplary wire joining apparatus made in accordance with the present invention;

FIG. 6 is a left side elevational view of the joining apparatus of FIG. 5;

FIG. 7 is a left side elevational view of the joining apparatus of FIG. 5 illustrating a finger in an open position;

DETAILED DESCRIPTION OF EXEMPLARY EMBODIMENTS

Figure 1:
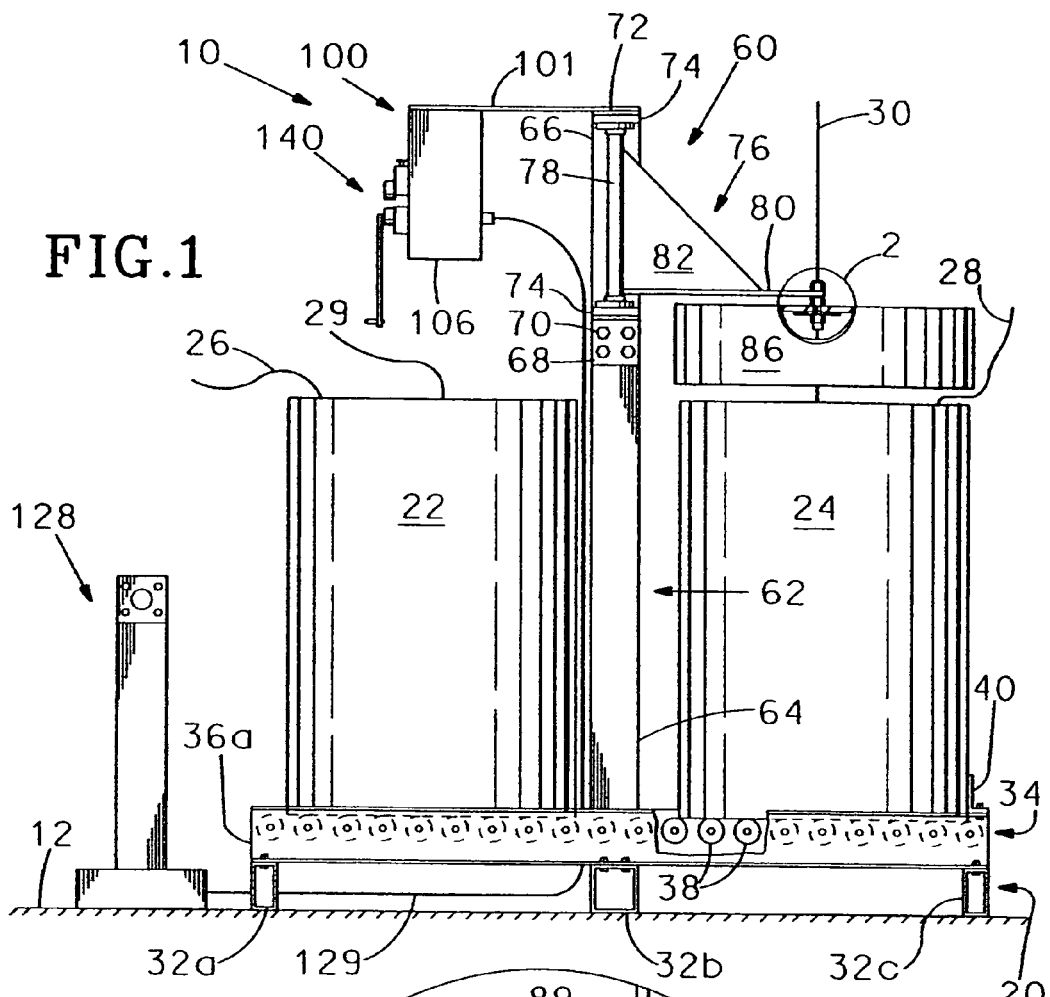
FIG. 1 is a front elevational view of an exemplary apparatus for joining, reducing and supplying a continuous source of wire from multiple source barrels in accordance with the present invention.

Referring to the drawing figures in detail, wherein like numerals indicate the same elements throughout the drawing figures, FIG. 1 illustrates a front view of an exemplary apparatus 10 for joining, reducing and supplying a continuous source of wire. Generally, the apparatus 10 may comprise a base 20, a swing arm apparatus 60 and a wire joining apparatus 100. Two barrels of wire 22 and 24 may comprise a first and second wire 26 and 28, respectively. Particularly, barrel 24 would include a leading end of its wire supply, which becomes the feeding wire 30 fed into the machine, and a trailing end (e.g. wire 28). Similarly, barrel 22 would have a leading end (e.g. wire 26) and a trailing end (e.g. wire 29). The barrels 22 and 24 may be positioned on base 20 and their respective first and second wires 26 and 28 joined by wire joining apparatus 100 so that when the wire in barrel 24 is depleted, swing arm apparatus 60 may rotate its swing arm assembly 76 and cover 86 over to barrel 22, and leading end (e.g. wire 26) of barrel 22 then provides feeding wire 30 which may continue to be drawn by a feeding machine (not shown) in an uninterrupted manner. Afterwards, empty barrel 24 may be removed, barrel 22 may be moved to the position formerly occupied by barrel 24 along rollers 38 of base 20, and a new, full third barrel may be positioned on base 20. Thereafter the leading end of the wire in the third barrel may be joined with the trailing end (e.g. wire 29) from barrel 22. As such, the apparatus 10 of the present invention can provide a continuous source of wire for supply to a feeding machine or other apparatus.

Figure 3:
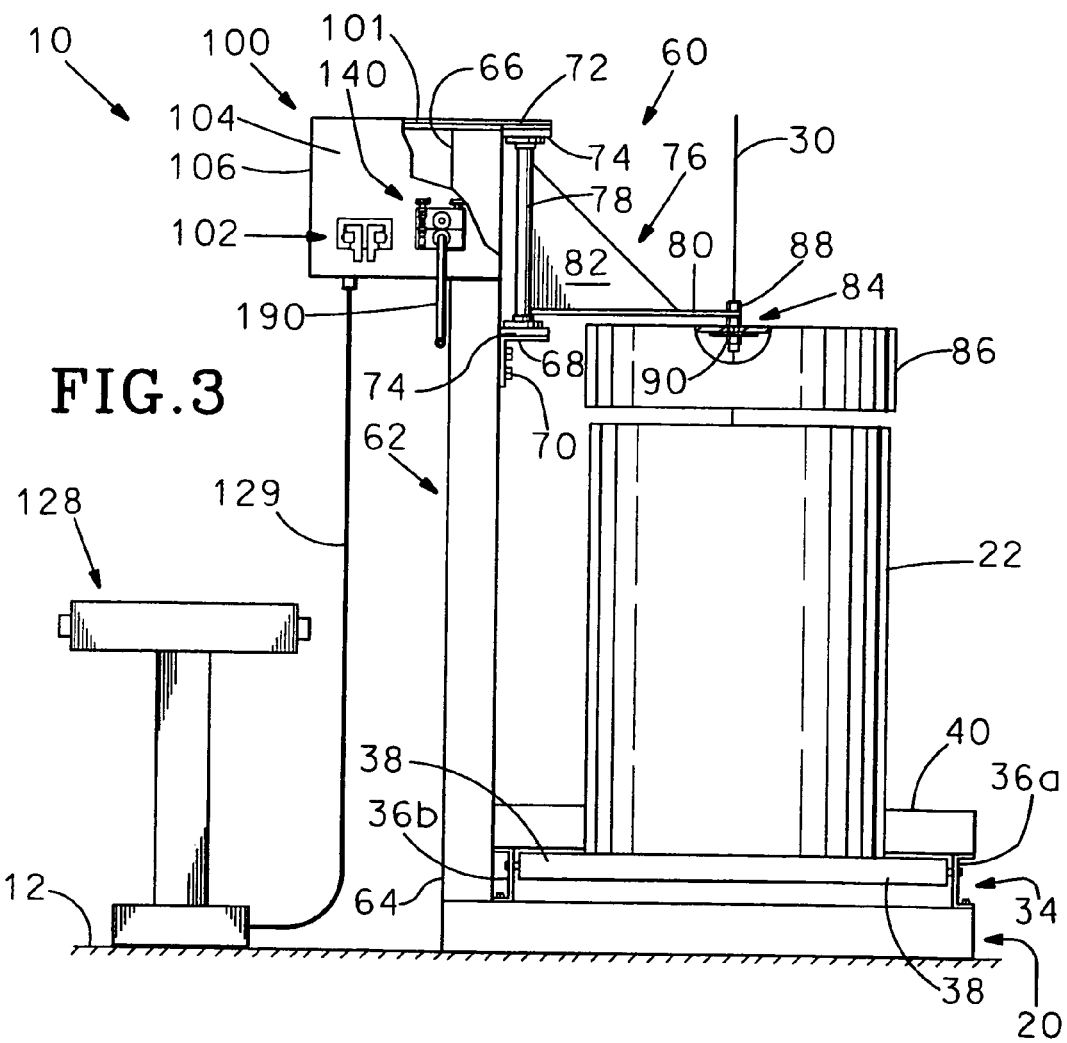
FIG. 3 is a partially broken out side elevational view of the apparatus of FIG. 1 illustrating swing arm apparatus over second barrel.

Referring to FIGS. 1 and 3, exemplary base 20 is illustrated as comprising three support beams 32a-c with a roller assembly 34 mounted thereto. Base 20 may be positioned on a surface (e.g. floor) 12 and its components may be comprised of steel or any other durable materials configured to support one or more barrels 22 and 24 positioned thereon. As illustrated in FIGS. 1 and 3, a roller assembly 34 or similar barrel manipulation surface may be provided to support the barrels comprising two U-shaped roller beams 36a and 36b with a plurality of rollers 38 rotatably mounted therebetween. For purposes of illustration, a segment of roller beam 36a in FIG. 1 has been removed to show rollers 38. In an other embodiment, barrel manipulation surface may comprise, for example, any low friction arrangement of rollers, an air bed and/or a conveyor system. Roller beams 36a and 36b may be approximately 5 ft. (1.52 m) in length whereas rollers 38 may be approximately 2.5 ft. (0.76 m) in length. While such dimensions may be desirable to support two relatively standard circular barrels of wire 22 and 24 approximately 2 ft. (0.61 m) in diameter, roller beams 36a and 36b and rollers 38 may comprise any size or shape configured to support any number of barrels or other sources of wire with any desired diameter. As described later herein, rotational mounting of the rollers 38 about roller beams 36a and 36b may facilitate movement of barrels 22 and 24 or other sources of wire along base 20.

As previously discussed, base 20 may be configured to support a plurality of barrels (e.g. 22 and 24). Barrels 22 and 24 may be comprised of cardboard, steel and/or any other suitable material for storing wire. As illustrated in FIGS. 1 and 3, barrels 22 and 24 may be generally circular in shape and approximately 3 ft. (0.91 m) in height and 2 ft. (0.61 m) in diameter. In another embodiment, barrels 22 and 24 may comprise any shape and/or size suitable for storing wire including, but not limited to a square or polygon. In addition, each barrel 22 and 24 may comprise wire circularly wrapped within the perimeter of the barrels 22 and 24 to minimize bending or "kinking" as the wire is pulled out. In another embodiment, barrels 22 and 24 may comprise a rotatable or non-rotatable spool with wire wrapped around the outer perimeter of the spool. If desired, barrels 22 and 24 may be packaged with wire so that the two ends (e.g. the leading and trailing ends, respectively) of the wire are accessible to be joined to wire from another barrel. In such way, each barrel may be successively joined to two other barrels as described herein.

However, while the present invention may utilize the barrels described above and illustrated in FIGS. 1 and 3, it should be understood that any containers and/or sources of wire may be supported by base 20, joined together with wire joining apparatus 100 and supplied through swing arm apparatus 60. Also, while it is envisioned by the exemplary embodiments shown that the wire within the barrels 22 and 24 may be supplied to a feeding machine and utilized as, for example, weld wire in a production process such as vehicle manufacture, it is contemplated that the present invention may also be used to join and supply a continuous source of wire for use in a variety of industries and processes including, but not limited to telecommunications wires.

Referring to FIG. 3, the exemplary wire joining apparatus 100 has been partially broken out to better illustrate the exemplary swing arm apparatus 60 of the present invention. As illustrated in FIGS. 1 and 3, swing arm apparatus 60 may comprise a swing arm mount 62 including a generally square shaped post and a swing arm assembly 76. Such embodiment may be useful to position the swing arm assembly 76 above the sources (e.g. barrels) of wire. In another embodiment, swing arm mount 62 may comprise any shape and/or height necessary to situate a swing arm assembly 76 adjacent to appropriate sources of wire and to allow the swinging alternation of the wire guiding components and/or cover between wire sources, as will be explained. Swing arm mount 62 and other components of swing arm apparatus 60 may be provided in the form of steel, plastic or any other strong and durable material. Swing arm mount 62 may comprise a lower end 64 and an upper end 66. As illustrated in FIG. 1, lower end 64 of swing arm mount 62 may be secured to center support beam 32*b* of base 20. In another embodiment, swing arm mount 62 may be secured to any portion of base 20, or alternatively, could be supported independently (e.g. on surface 12).

Swing arm mount 62 may support an L-shaped bracket 68 (best seen in FIG. 3) mounted thereto with fasteners 70. The upper end 66 of swing arm mount 62 may similarly include a mount plate 72 secured to swing arm mount 62 such as by a weld or other fastening arrangement. As illustrated in FIG. 3, two bearing plates 74 may be mounted to the bracket 68 and mount plate 72, respectively, and be configured to provide an effective bearing arrangement for rotatably receiving the swing arm assembly 76 therebetween. In another embodiment, swing arm assembly 76 may be rotatably mounted only to bracket 68 or, alternatively, directly to bracket 68 and mount plate 72.

Swing arm assembly 76 may also comprise a swing post 78 rotatably secured between bearing plates 74. An extension arm 80 may extend from swing post 78 such as at an approximately 90 degree angle in relation to the swing post 78. This angle could of course vary among particular applications of the invention. If desired, swing plate 82 or other support span (e.g. a rod or cable) may be secured between the swing post 78 and the extension arm 80 to enhance the stability and strength of swing arm 76. As will be understood, the swing arm assembly 76 could be sized and configured to effectively and selectively rotate between two or more barrels or sources of wire.

While the invention has been described as utilizing a "swing arm" to rotate between sources of wire, it should be understood that one crux of the present invention is the movement of the "swing arm" relative to the base. Accordingly, in another embodiment, "swing arm" may actually be a stationary support arm wherein the base is configured to position any variety of sources of wire so that "swing arm" may guide and/or cover wire egressing from the barrel or other source of wire. Therefore, it is contemplated that the swing arm/base combination may be configured in a plurality of arrangements providing relative movement between the swing arm and base.

Figure 2:
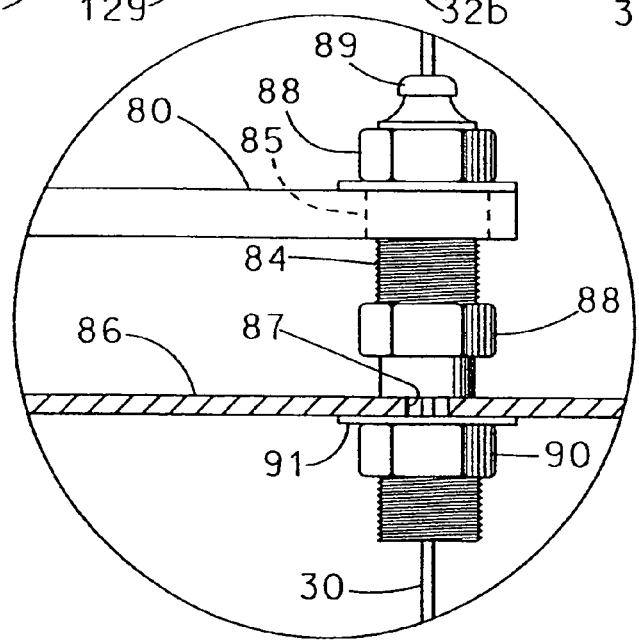
FIG. 2 is an enlarged view of the guide member and extension arm of FIG. 1.

As illustrated in FIGS. 1-3, extension arm 80 of swing arm assembly 76 may be configured so that an alignment guide port or aperture 85 located adjacent the distal end of extension arm 80 may be positioned approximately over the center of barrel 22 or 24 or other source of wire. As discussed later herein, such configuration of the swing arm assembly 76 and the guide port 85 not only provides direction for wire through the aperture in the extension arm 80 as it egresses from the barrel, but also allows the swing arm assembly 76 to rotate between barrels when wire from the feeding barrel is depleted.

Still referring to FIGS. 1-3, a directing member 84 may be secured within the guide port 85 of extension arm 80. The directing member 84 may comprise a tube with a threaded outer circumference and may be comprised of steel, plastic or any other durable material. In one embodiment, directing member 84 may be secured to extension arm 80 by, for example, inserting directing member 84 through guide port 85 of extension arm 80 and securing a bolt 88 to the upper and lower end of directing member 84. In another embodiment, guide port 85 in extension arm 80 may serve as an appropriate directing member. It is contemplated that directing member may be rigidly fixed to extension arm 80 or pivotally attached to accommodate differing payout angles.

The directing member 84 may serve as a guide for wire egressing from barrels 22 and 24. For example, in barrels where the wire is circularly wrapped within the barrel, unraveling of the wire as the feeding machine pulls the wire may result in undesired vibrations in the feeding machine. The directing member 84 may decrease the vibrations realized by the feeding machine by effectively providing a guide to direct a smooth stream of wire out of the barrel or from any appropriate source of wire. If desired, such guiding movement may be further facilitated by securing a guide funnel 89 atop upper bolt 88. As discussed later herein, directing member 84 may also serve as a guide to rotate swing arm assembly 76 into a proper position over a second source of wire once the first source is depleted.

Figure 4:
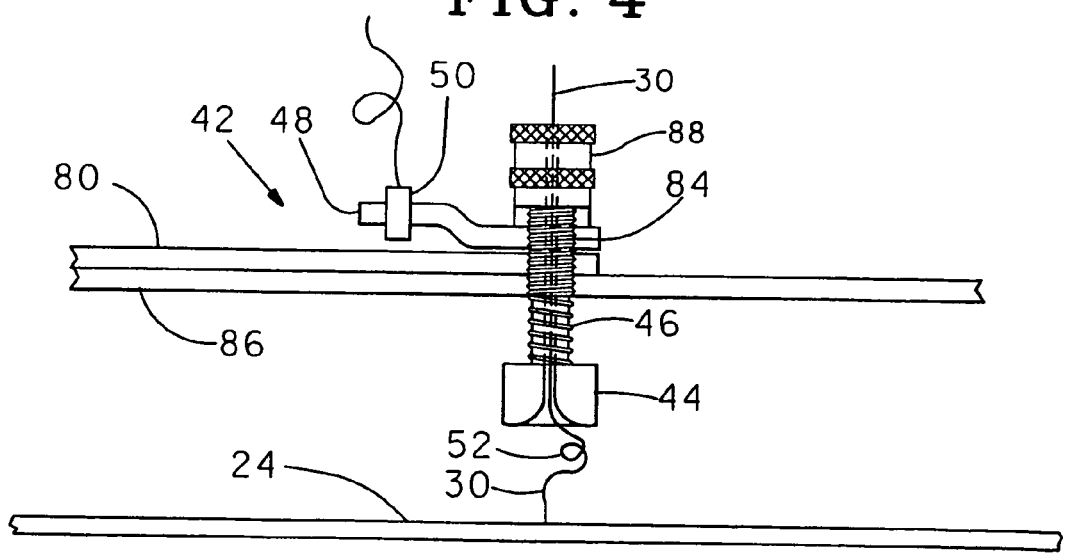
FIG. 4 is a front elevational view of an exemplary wire twist sensor in accordance with the present invention.

Another aspect of the present invention is that a sensor may be integrated with the extension arm and guide member so as to detect a twist of the wire within the barrel that may be formed as wire unwinds within the barrel during egress. For example, referring to FIG. 4, an exemplary twist sensor assembly 42 may comprise an inlet funnel 44, a funnel biasing member 46, a sensing arm 48 and a sensor 50. In use, funnel biasing member 46 biases funnel 44 downward and sensor 50 contacts extension arm 80 (as illustrated in FIG. 4). Should a twist 52 develop in feeding barrel 24, such increased diameter of twist 52 passing through funnel 44 may cause funnel to act against biasing member 46 thereby forcing guide member 84, sensing arm 48 and associated sensor 50 upward. Sensor 50 may detect such disconnect from the extension arm 80 and cut power to the feeding machine, sound an alarm or facilitate another appropriate response.

As illustrated in FIGS. 1-3, directing member 84 may also be used to attach a barrel or source cover thereto. Barrel cover 86, for example, may be secured to directing member 84, and therefore, extension arm 80, by inserting directing member 84 into aperture 87 of barrel cover 86 and securing a bolt 90 to lower end of directing member 84. In another embodiment, barrel cover 86 may be directly secured to extension arm with, for example, guide member 84 (e.g. FIG. 4). Alternatively, extension arm 80, directing member 84 and/or barrel cover 86 may comprise a unitary structure formed of metal and/or molded plastic.

Barrel cover 86 may be comprised of cardboard, plastic or any other durable material and may be configured to substantially or completely cover the effective open portions of one of barrels 24 and 26. In one embodiment, a single barrel cover 86 may be constructed to cover a variety of barrels or sources of wire. For example, barrel cover 86 may be comprised of inwardly collapsible mesh wire or plastic so that the barrel cover 86 may vary diameter or size according to the specific barrel or source of wire. Another design might include tapered outer edges which accommodate containers of different diameters, shapes, and/or configurations, or might have multiple interface edges designed to receive or otherwise effectively accommodate different barrel sizes or shapes. In addition, such barrel cover 86 may comprise pre-fit or threaded apertures to facilitate easy mounting to the directing member 84. If desired, barrel cover 86 may comprise its own directing member (e.g. a directing member 84 rigidly secured to the barrel cover 86) to facilitate simple association with the extension arm 80.

In the industry, some barrels of wire may be shipped to manufacturers with a barrel cover or lid already covering the barrel. In such case, the cover or lid shipped with the barrel may be utilized with the apparatus by forming an aperture in the barrel lid and securing the barrel lid to the directing member with a bolt. If desired, a washer or reinforcing ring 91 (see FIG. 2) may be provided around the bolt to further support the barrel lid. It should be understood, however, that while the present invention may be used without a barrel cover, it is contemplated that barrel cover (e.g. 86) may be useful to cover wire egressing from barrel to prevent a worker, machine or any other parts from contacting the feeding wire 30.

In use, swing arm assembly 60 may rotate from one barrel or source of wire to another upon depletion of wire in the feeding barrel. For example, as illustrated in FIG. 1, feeding wire 30 may egress barrel 24 (feeding barrel in this example). Once first and second wire 26 and 28 have been joined by, for example, wire joining apparatus 100 (discussed later herein), upon depletion of feeding wire 30 in feeding barrel 24, since barrel 22 is spaced somewhat from the center of barrel 24, the joined wire (e.g. the wire resulting from weld between 26 and 28) may exert a transverse force on directing member 84 as it is drawn thereto. Such force acts on extension arm 80 to tend to rotate swing arm post 78 about bearing plates 74 to a location wherein extension arm 80 (and barrel cover 86) may be positioned approximately over barrel 22 (e.g. FIG. 3). As described further below, once depleted, first barrel 24 may be removed and second barrel 22 may be moved to the position formerly occupied by first barrel 24 by sliding barrel 22 along the rollers 38 of base 20. If desired, a stopper 40 or other limiting arrangement may be secured to one or more positions about base 20 to prevent barrels or other sources of wire from slipping off of the base when barrels are moved. Such movement also rotates swing arm 76 so that directing member 84 (and barrel cover 86) is positioned approximately over the center of barrel 22, which will now be the feeding barrel. A third barrel may then be positioned on base 20 where barrel 22 was originally located (this third barrel will now be connected to the trailing end wire of barrel 22 to be readied for use). In another embodiment, apparatus may comprise any number and variety of sensors to detect the amount of wire remaining in barrels and thereby electronically activate rollers of base 20 to automatically move barrels to a desired position about base 20 and/or rotate swing arm assembly 76 to a desired position relative to the respective barrels.

Another aspect of the present invention is that a wire joining apparatus 100 may be positioned adjacent the swing arm apparatus 60 and base 20 described above. Referring to FIGS. 1 and 3, an exemplary wire joining apparatus 100 may be positioned to the side and rearward of the swing arm apparatus 60. While such position is not critical, this position may not only reduce interference with the swing arm assembly 76, but can also facilitate addition of a second station and/or swing arm assembly (discussed later herein) positioned opposite the illustrated swing arm assembly. In another embodiment, any appropriate wire joining apparatus may be positioned at any location adjacent the base 20 and/or swing arm apparatus 60.

Referring to FIGS. 1, 3 and 5 an exemplary wire joining apparatus 100 is illustrated as being secured to the upper end 66 swing arm mount 62 by, for example, extension plate 101. Wire joining apparatus may comprise a wire holding assembly 102 and a reducing assembly 140 secured to a base surface such as face 104 of control panel 106. Referring to FIGS. 5-7, wire holding assembly 102 may comprise a mount block 108 including two fingers 110 and 112 pivotally mounted thereto with pins 114 and 116. Block 108 and fingers 110 and 112 may be comprised of rubber, plastic, composite or any other non-electrically conductive material. In another embodiment, any arrangement capable of stabilizing a wire and applying an electric current may be used. As illustrated in FIGS. 5-7, block 108 may be mounted to a base surface such as panel 106 by screws 118 or any other appropriate fastening arrangement. Block 108 may also comprise two nubs 120 for pivotally mounting fingers 110 and 112 thereto. In addition, block 108 may comprise a first contact plate 122 secured to block 108 with adhesive or any other fastening arrangement. Contact plate 122 may be comprised of steel, brass, gold, copper or any other suitably electrically conductive material. In addition, contact plate 122 may comprise a groove 130 (best seen in FIG. 7) for receiving one or more wires therein. As described later, contact plate 122 may be associated with a current transformer (not shown) or other electrical device for supplying electricity to contact plate 122.

Fingers 110 and 112 may be generally F-shaped for pivotal mounting to nubs 120. In another embodiment, fingers 110 and 112 may comprise any shape configured to secure a wire against contact plate 122 of mount block 108. The upper portion of fingers 110 and 112 may comprise second and third contact plates (124 of finger 110 illustrated in FIGS. 6-7), respectively, secured to each finger 110 and 112 with adhesive or any other fastening arrangement. Second and third contact plates 124 may similarly be comprised of steel, brass, gold, copper or any other electrically conductive material and comprise grooves for receiving one or more wires therein.

As illustrated in FIGS. 5-6, contact plate 126 may be biased against contact plate 124 with, for example, biasing member 127. Biasing member 127 may comprise a spring or any other biasing element. As illustrated in FIG. 7, finger 110 (and associated contact plate 124) is illustrated in the open position (i.e. ready to accept a wire for welding). Contact plates 124 may be used to transfer electricity from the contact plate 122 to a wire within the grooves 130 of the contact plates thereby welding two wires together. For example, a current transformer may be located within control panel 106 and include one or more line contacts through apertures of mount block 108 to contact plate 122. The contact plate 122 may transfer the current to wires associated with the contact plates 124 so as to effectively weld the wires to one another.

The electric current may be directed from the current transformer to the contact plates by activating a switch or button. The switch or button may be located on the control panel 106 or, as illustrated in FIGS. 1 and 3 from a remote location, such as an activating stand 128. Activating stand 128 may comprise one or more switches or buttons to activate a current transformer or other apparatus to apply electric current to contact plate 122. Activating stand 128 may be connected to control panel 106 through cable 129 or any other appropriate arrangement. In another embodiment, any arrangement configured to activate and supply electricity to contact plate 122 may be utilized. In addition, a current transformer or other power supply may be configured to apply current, for example, in the range of approximately 2-20 Amps. As described later, it is believed that application of such a tuned and relatively low current may minimize the spur resulting from welding two wires together. In another embodiment, any appropriate amount of current may be applied to wires to create a suitable weld therebetween.

Referring to FIGS. 1, 3 and 5-7, in use, first wire 28 from first barrel 24 may be fed through reducing assembly 140 (described further below) from right to left (e.g. through rollers 148 and 164 and cutting die 146 and 162). First wire 28 may then be inserted into the groove 130 between contact plate 122 of mount block 108 and contact plate of finger 112 at approximately the center of contact plate 122 by pushing finger 112 against biasing member and inserting first wire 28 into the contact plate grooves 130. The biasing member may then tend to hold contact plate against contact plate 122 with first wire 28 disposed therebetween. Second wire 26 may then be fed though holding assembly 102 from left to right. Second wire 26 may be inserted into the groove 130 between contact plate 122 of mount block 108 and contact plate 124 of finger 110 at approximately the center of contact plate 122 by pushing finger 110 against biasing member 127 (see FIGS. 6-7) and inserting second wire 26 into the groove 130. The biasing member 127 may then bias contact plate 124 against contact plate 122 with second wire 28 disposed therebetween.

As previously discussed, a spur (e.g. a raised portion at and surrounding the connection or weld) may occur as a result of the welding connection process which generally results in effectively rendering at least a portion of the abutted wires in a flowable condition. More particularly, because the wires are associated with one another and subsequently heated, flowable material tends to be pushed outward around the connection or weld. The spur may lead to problems in that it may jam the feeding machine as the effective diameter of the section of the wire including the spur may be too large to pass through the feeding machine. In one embodiment, first and second wires 26 and 28 may be secured by holding assembly 102 so that the wires gently abut one another without much force. The force exerted between the wires may be manually controlled by the technician and/or electric motors, if desired. It is believed that such arrangement (e.g. reduced or minimal abutting force) may reduce the spur that results when the wires are welded together (e.g. current and/or heat is applied to the wires). For example, when pressure between the wires is minimized less material tends to be displaced outwardly as the wire material becomes heated and flowable and/or molten. Such may also be accomplished by regulating the electric current applied to the wires. In another embodiment, first and second wires 28 and 26 may be associated with one another in the holding assembly 102 with any force desired to sufficiently connect first and second wire 28 and 26 to one another.

While the present invention addresses the need for spur minimization by applying, in one embodiment, low abutting pressure and current in the welding process, another aspect of the present invention provides a spur reducing assembly adjacent the holding assembly for efficiently reducing any resulting spur.

Figure 8:
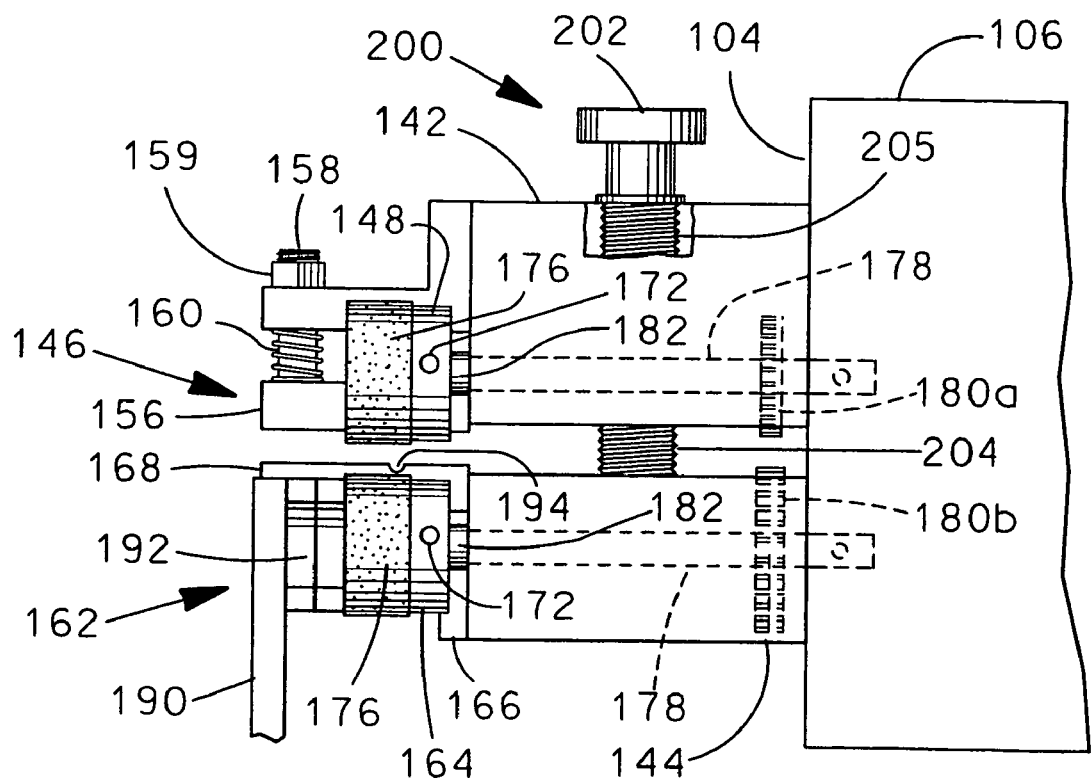
FIG. 8 is a right side elevational view of the joining apparatus of FIG. 5, illustrating the exemplary reducing assembly in an open position.

Referring to FIGS. 5 and 8, an exemplary spur reducing assembly 140 is illustrated as comprising upper and lower mount blocks 142 and 144 wherein, in this example, lower mount block 144 may be movably mounted to face 104 of panel 106 and upper mount block 142 is similarly secured to lower mount block 144 by, for example, tightening screws (seen best at 204 in FIG. 8). Lower mount block 144 may also comprise a lower die assembly 162 and a lower feed roller 164 rotatably secured thereto. Upper mount block 142 may similarly comprise an upper die assembly 146 and an upper feed roller 148 rotatably secured on an axle or bearing 178 secured thereto. Lower die assembly 162 may comprise a bracket 166 configured to mount lower die assembly 162 to lower mount block 144. More particularly, bracket 166 may be secured to mount block 142 with fasteners 167 or any other attachment arrangement. Upper die assembly 146 may similarly comprise a bracket 152 configured to mount upper die assembly 146 to upper mount block 142 by securing bracket 152 to mount block 142 with fasteners 167. While such embodiment allows upper mount block 142 to move vertically relative to stationary lower mount block 144, it is contemplated that mount blocks 142 and 144 may both be stationary with moveable die assemblies and feed rollers (discussed further below) or moveable relative to one another.

As shown in this illustrative example, upper and lower die assemblies 146 and 162 may also comprise upper and lower cutting dies 156 and 168 associated with their respective brackets 152 and 166. In one embodiment, upper and lower cutting dies 156 and 168 may comprise apertures for securing cutting dies to a bracket and/or bolt as described below. As illustrated in FIGS. 5 and 8, lower cutting die 168 may be mounted upon bracket 166. For example, bracket 166 may include one or more vertical members (not shown) for insertion into apertures of lower cutting die 162 thereby rigidly securing lower cutting die 162 to bracket 166. Upper cutting die 156 may be attached to bracket 152 by, for example, die bolts 158. More particularly, die bolts 158 may be inserted through apertures in the upper cutting die 156. Die bolts 158 may each comprise a head (not shown) to prevent the upper cutting die 156 from slipping off of bolts 158. Die bolts 158 and the upper cutting die 156 may be secured to bracket 152 with, for example, nuts 159. If desired, springs 160 may be associated between bracket 152 and upper cutting die 156 and may be used to bias upper cutting die downward in use. So as to provide freedom of movement of the upper cutting die 152 in use.

As illustrated in FIG. 8, upper and lower cutting die 156 and 168 may also comprise a groove (groove 194 shown on upper surface of upper cutting die) located on the upper and lower surfaces of each cutting die 156 and 168. In use, the respective grooves 194 define a guide channel for the wire within the upper and lower die 156 and 168. In another embodiment, a groove 194 may be located only on one surface (i.e. lower surface of upper cutting die 156 and upper surface of lower cutting die 168) of each die.

The advantages of configuring each cutting die with grooves 194 on both their upper and lower ends may be twofold. First, when cutting edges become worn, rather that replacing the entire cutting die 156 and 168, the cutting die 156 and 168 may be flipped over to quickly provide a new cutting edge as a result of the wedge-like cut 170 of the die. For example, when not in use, tightening assemblies 200 (discussed later) may be loosened so that upper and lower die assemblies 156 and 168 may be moved at a distance from one another. Nuts 159 may be loosed and die bolts 158 may be removed from bracket 152. Die bolts 158 may then be removed from upper die 156, upper die 156 may be flipped to expose the lower surface and re-assembled with bracket 152.

Lower die 168 may similarly be lifted off of the vertical member of bracket 166, flipped to expose its lower surface and reinserted on bracket 166. As such, new cutting edges may be provided thereby extending the life of cutting dies 156 and 168. Alternatively, if desired, the groove 194 on one surface of each cutting die 156 and 168 may have a different diameter than the groove on the opposite surface. Such configuration may be useful when the wire joining apparatus 100 is used to join and reduce wires of varying diameter. For example, first cutting edges and associated groves may be configured to guide/cut wire approximately 0.035 in. (0.89 mm) in diameter or gauge, whereas second cutting edges and associated groves may be configured to guide/cut wire approximately 0.045 in. (1.14 mm) in diameter or gauge.

As illustrated in FIG. 5, feed rollers 148 and 164 may be generally circular in shape and be comprised of steel, plastic or any other durable material. Feed rollers 148 and 164 may be rotatably secured to upper and lower mount blocks 142 and 144, such as by mounting an axle or bearing arrangement (e.g. 178). In another embodiment, wherein mount blocks 142 and 144 are rigidly secured to panel 106, feed rollers 148 and 164 may be vertically moveable or adjustable relative to mount blocks 142 and 144 to facilitate feeding and securing a wire therebetween. Also, if desired, feed rollers 148 and 164 may comprise a plurality of grippers 176 (best seen in FIG. 8) or similar knurled or friction type surface finish on their outer circumference. As described later herein, grippers 176 may be useful to facilitate movement of the wire through the cutting assembly.

As illustrated in FIG. 8, feed rollers 148 and 164 may comprise an aperture 172 for receiving a set screw (not shown), wherein the set screw may be used to connect the feed rollers 148 and 164 to axle 178 disposed within mount blocks 142 and 144. Attached at the opposite end of the axles 178 may be upper and lower gears 180a and 180b. Upper and lower gears 180a and 180b may similarly be secured to axle 178 with a set screw or other fastening arrangement. In another embodiment, axle 178 and gears 180a and 180b and/or feed rollers 148 and 164 may comprise a single unitary part. As described later herein, in use, upper and lower gears 180a and 180b may be associated with one another to drive both feed rollers upon rotation of one feed roller (i.e. lower feed roller 164). In another embodiment, however, feed rollers 148 and 164 may be driven by motors or other arrangements configured to pull a connected wire through die assemblies.

Still referring to FIG. 8, spacers 182 may be secured (e.g. set screws) to axles 178 to position feed rollers 148 and 164 at a distance automatically from mount blocks 142 and 144. Such configuration may allow the feed rollers 148 and 164 to centrally align with die cutters 156 and 168, respectively, to better pull the wire through the reducing die assemblies. In another embodiment, feed rollers 148 and 164 may comprise any size or width appropriate to pull a connected wire through die assemblies.

A handle 190 and handle spacer 192 may be secured to one of the rollers (e.g. lower feed roller 164). In addition, upper feed roller 148 may be similarly configured to support handle 190 and handle spacer 192, if desired. Handle spacer 192 may comprise any appropriate piece of metal or plastic and may be used to prevent interference between the handle 190 and the opposite feed roller. Handle 190 may be used to manually rotate feed roller 164, thereby rotating axle 178 and driving upper feed roller 148 through associated gears 180a and 180b. Accordingly, the feed rollers 148 and 164 may work in conjunction with one another to move a connected wire through the reducing assembly 140. In another embodiment, feed rollers 148 and 164 maybe linked so as to automatically rotate feed rollers 148 and 164 upon selective actuation of a mechanical switch or upon sensing of completion of the connection or welding process.

Referring to FIGS. 5 and 8, reducing assembly 140 may comprise one or more tightening assemblies 200. Each tightening assembly 200 may comprise a knob 202 positioned atop upper mount block 142 and secured to a tightening screw 204. Two tightening assemblies may be preferred, for example, to better control the movement and position of upper mount block 142 and associated components. Each tightening screw 204 may extend through a threaded channel 205 located in upper and lower mount blocks 142 and 144. Tightening assemblies 200 allow the reducing assembly 140 to be moved between open and closed positions. For example, FIG. 5 illustrates the reducing assembly in a closed position (e.g. spur is to be cut from a welded wire). Upon rotation of the tightening assemblies 200 in a loosening direction, upper and lower blocks 142 and 144 may be moved away from each other and into an open position (e.g. when wire is to be inserted or removed from the reducing assembly), as illustrated in FIG. 8. In another embodiment, lower mount block 142 may be moveable relative to a stationary upper mount block 144. Additionally, upper and lower mount blocks 142 and 144 may comprise electric motors and a switch for automatically moving mount blocks between open and closed positions.

In use, once the wire is secured in the wire holding assembly 102 (as described above), wire 28 may be inserted between upper and lower mount blocks 142 and 144, and particularly, between upper and lower cutting die 156 and 168 and upper and lower feed rollers 148 and 164. The upper and lower blocks 142 and 144 may then be moved to a closed position (best shown in FIG. 4) by rotating knobs 202 of tightening assemblies 200 while positioning wire within grooves 194 of upper and lower cutting die 156 and 168. Spring 160 may bias upper cutting die 156 against lower cutting die 168 with the wire inbetween the grooves 194. In addition, grips 176 of upper and lower feed rollers 148 and 164 may contact wire 28 to provide for additional control. Once the wire is welded within wire holding assembly 102 (described above) and the connection or welding process completed, a worker may manually crank the handle 190. Lower feed roller 164 and associated axle/gear 178/180b drive the upper feed roller 148 through associated axle/gear 178/180a. Grippers 176 located on the feed rollers 148 and 164 may be used to grip and pull the wire through the grooves 194 of the upper and lower cutting die 156 and 168. The enlarged portion of the wire or spur is thereby removed or sufficiently reduced from the wire as it passes by the cutting edges and through the cutting die groves 194. Once the spur is removed, the reducing assembly may be moved into an open position by rotating knobs 202 of tightening assemblies 200 in a loosening fashion. Thereafter, the connected wire is removed from apparatus 100 for continued feeding through apparatus 10. Alternatively, in situations where the worker is not satisfied that the wire has been sufficiently reduced (e.g. the spur has not been completely removed), the worker may reverse the rotation of the handle 190 and direct the portion of the wire with the spur through the cutting edges once again. This process may be continued until the spur has been effectively removed from the wire. As such, the wire joining apparatus of the present invention is configured to easily and effectively join and reduce wire at the same station, thereby eliminating excess steps of removing a welded wire from a welding assembly and manually removing a spur and/or inserting the wire into a reducing assembly.

Figure 9:
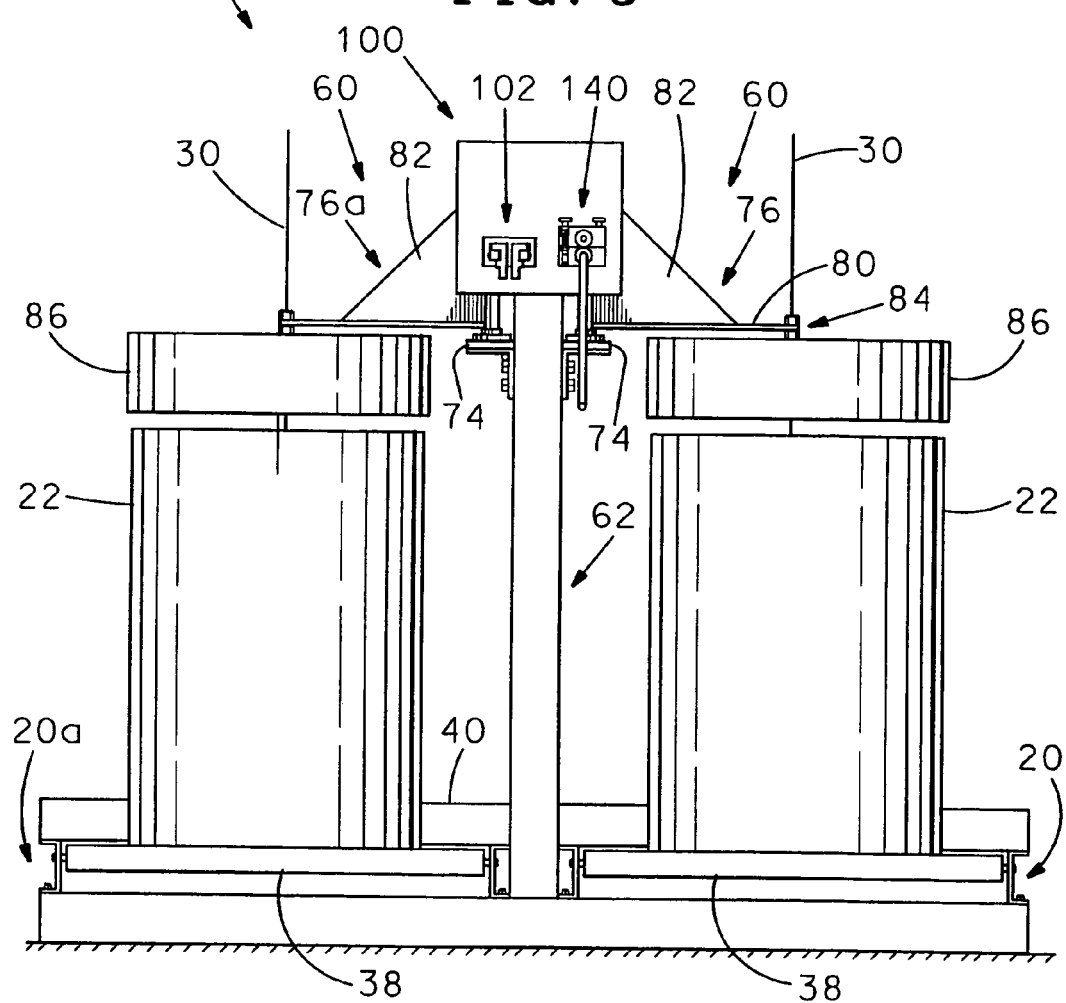
FIG. 9 is a side elevational view of an alternative embodiment of an apparatus for joining, reducing and supplying a continuous source of wire made in accordance with the present invention.

Another aspect of the present invention is that a second base 20a or station may be positioned adjacent the first base 20 (described above), the swing arm apparatus 60 and the wire joining apparatus 100 so that the wire joining apparatus 100 may be utilized to join and reduce wire for supply to a second feeding machine through second swing arm assembly 76a from barrels or sources of wire positioned on base 20a. Referring to FIG. 9 an exemplary apparatus 210 of the present invention is illustrated as comprising two bases 20 and 20a, two swing arm assemblies 76 and 76a secured to a single swing arm mount 62 and both being associated with a wire joining apparatus 100. Base 20a and swing arm assembly 76a may be configured similarly to base 20 and swing arm assembly 76 as described above.

In use, a worker may join wires from barrels at first station 20 with, for example, wire joining apparatus 100 (discussed above). Afterwards, a worker may join wires from barrels at second station 20a with the same wire joining apparatus 100. If desired a second wire joining apparatus may be provided to weld wire at the second station, although unless the two sides will be depleting their barrels or sources at the same time, a common joining apparatus will likely be sufficient and will decrease space and cost requirements. A second wire joining apparatus may be appropriate, however, when, for example, the gauge of the wire at the second station differs from that at the first, and therefore, requires appropriately sized cutting die.

In addition, while FIG. 9 illustrates two swing arm assemblies 76 and 76a positioned over each station, it is contemplated that a single swing arm may be provided at approximately the center of a circular base and atop a swing arm mount with barrels of wire (i.e. four) arranged circularly around the base. After all barrels have been welded to one another (with wire in the fourth barrel only welded to wire of the third barrel), the swing arm may rotate 360° around barrels as wire egresses. Once wire is depleted in one barrel (i.e. the first barrel), the depleted barrel may be removed and a fifth barrel may be inserted adjacent second and fourth barrel and welded to the fourth barrel. In such embodiment, wire joining apparatus may be positioned at any location adjacent the base, or alternatively, in any embodiment described herein, may be removeably positioned adjacent base when in use.

Referring again to FIG. 1, and as can be appreciated from the foregoing description a process for supplying an effectively continuous source of wire may comprise the steps of providing at least a first and second barrel of wire 24 and 22 on a base 20. The base 20 may comprise a plurality of rollers 38 or other arrangement to facilitate movement of the barrels 22 and 24 about the base 20. If desired, a second station or base (20a in FIG. 9) may be provided adjacent the first base.

A wire joining apparatus 100 may be provided adjacent the first and second barrel and, as discussed above, may be configured to join the first wire 28 from the first barrel 24 with the second wire 26 from the second barrel 22. The wire joining apparatus 100 may join the first and second wire and may then be used to reduce any spur that may result from the connection by moving the joined wire through a wire reducing apparatus 140.

A swing arm apparatus 60 may also be provided adjacent the barrels of wire and may include a swing arm assembly 76 configured to transfer a barrel cover 86 from the first barrel 24 to the second barrel 22 when the feed wire 30 of the first barrel 24 is depleted. Once wire is depleted in the first barrel 24, the barrel cover 86 may be transferred from the first barrel 24 to the second barrel 22. This transfer can be the result of force applied to a guide member 84 associated with the swing arm assembly 76 and the barrel cover 86, and/or may be assisted by powered movement of the swing arm.

Afterwards, the first barrel 24 may be removed from the base 20 and the second barrel 22 may be relocated to the position formerly occupied by the first barrel 24. A third barrel (not shown) may then be positioned on the base and wire within the third barrel may be welded to wire within the second barrel 22. Accordingly, by utilizing the process of the present invention, a continuous source of wire may be provided.

Figure 10:
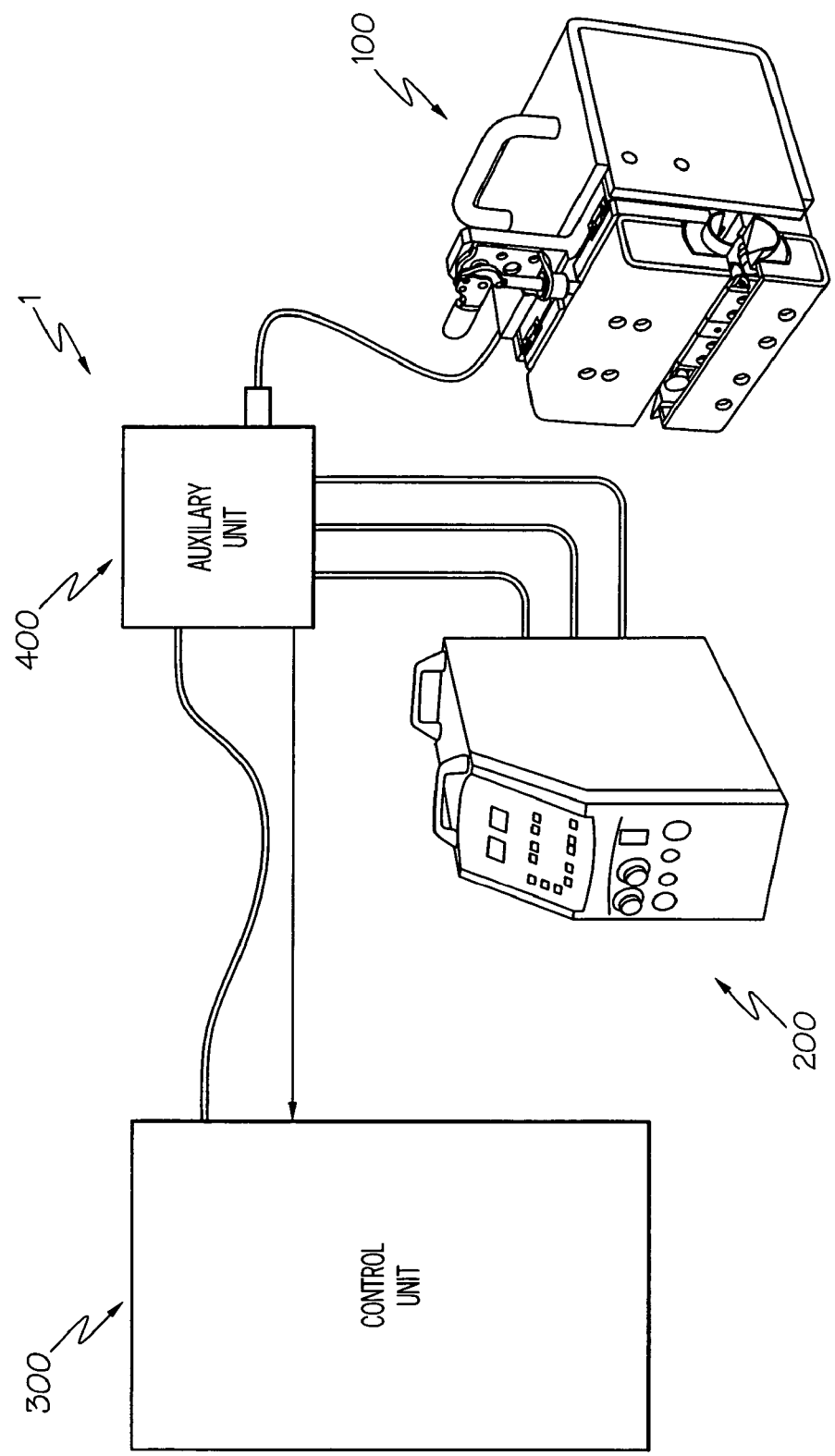
FIG. 10 is a schematic view of an example of a welding system for joining a first and second source of wire in accordance with the present invention.

Referring to an embodiment as shown in FIG. 10, a welding system 1 is illustrated. The welding system 1 comprises a welding unit 100, a power source 200 configured to provide electric current to the welding unit 100, and a programmable control unit 300. The programmable control unit 300 is configured to control the welding unit 100 and/or the power source 200. The power source 200, which comprises any suitable component operable to provide current, includes, but is not limited to, constant voltage direct current power sources, constant current sources, alternating current sources and the like. In one embodiment, the power source 200 may be an arc welding controller from Daihen®. The programmable control unit 300 may comprise various components familiar to one of ordinary skill in the art. In some exemplary embodiments, the programmable control unit 300 comprises a programmable logic controller, a processor, a computer, or combinations thereof. In additional exemplary embodiments, the programmable control unit 300 comprises software and/or a robot control mechanism. In yet another exemplary embodiment, the programmable control unit 300 and the power source 200 could be housed within the same unit, for example, in the welding controller by Daihen®.

In a further embodiment, the welding system 1 may also comprise an auxiliary control unit 400 configured to provide additional control of the welding unit 100 and/or the power source 200. The auxiliary control unit 400 may comprise components similar to the control unit, such as a programmable logic controller, a processor, a computer, or combinations thereof. The auxiliary control 400 unit may also comprise a valve or shut-off mechanism configured to restrict or permit the flow of current to the welding unit 100. In a further embodiment, the auxiliary control unit 400 may comprise a timer configured to restrict or permit current flow after a set period of time elapses.

Moreover, the welding system 1 may, in a further embodiment, comprise a wire feeding mechanism (not shown) operable to provide wire to the feed ports of the welding unit. The wire feeding mechanism may comprise any suitable feeding mechanism known to one skilled in art. In one embodiment, the wire feeding mechanism comprises a robot. The wire feeding mechanism may, in further exemplary embodiments, comprise any of the feeding mechanisms described above.

Figure 11:
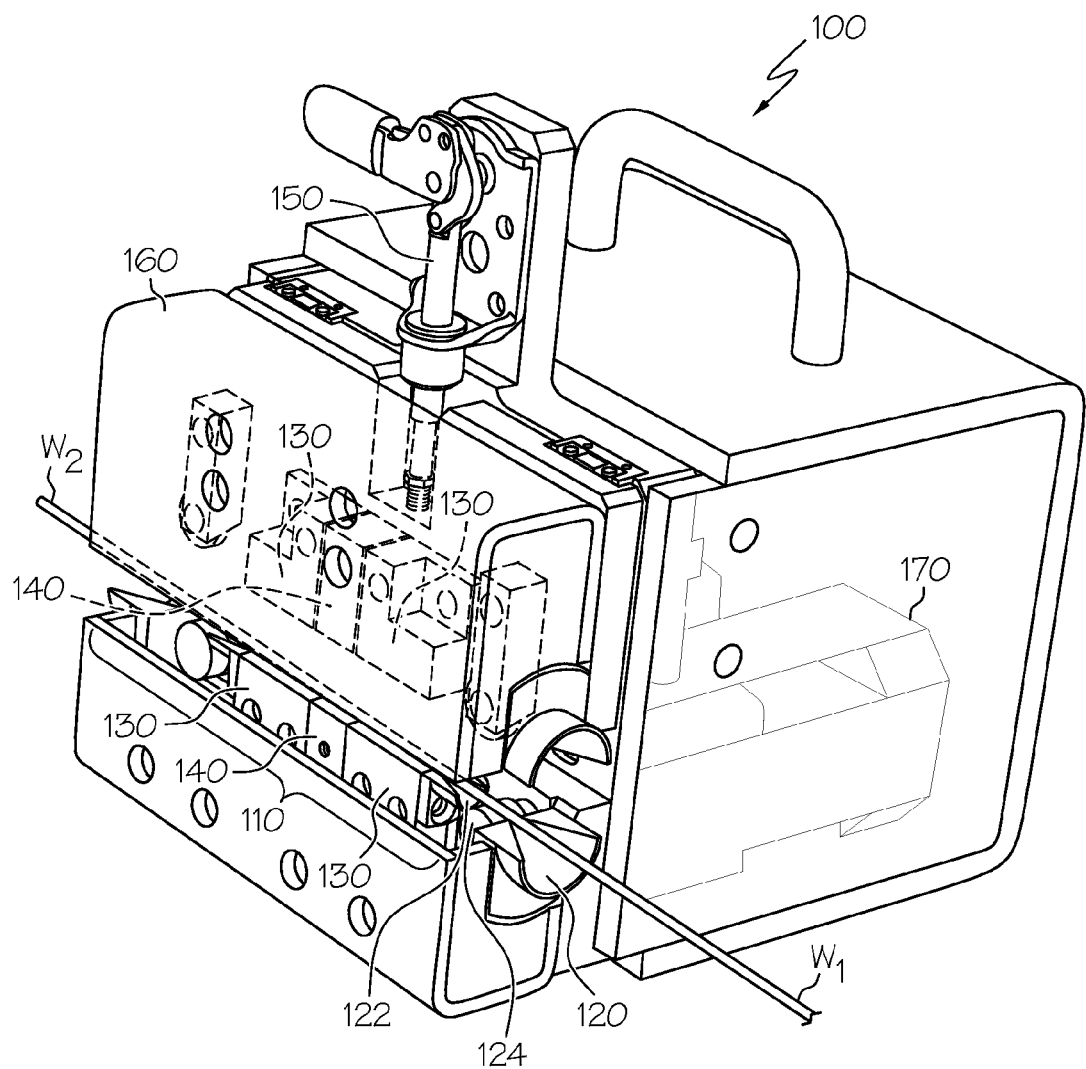
FIG. 11 is a schematic view of an example of a welding unit used in the welding system of FIG. 10 in accordance with the present invention.
Figure 12:
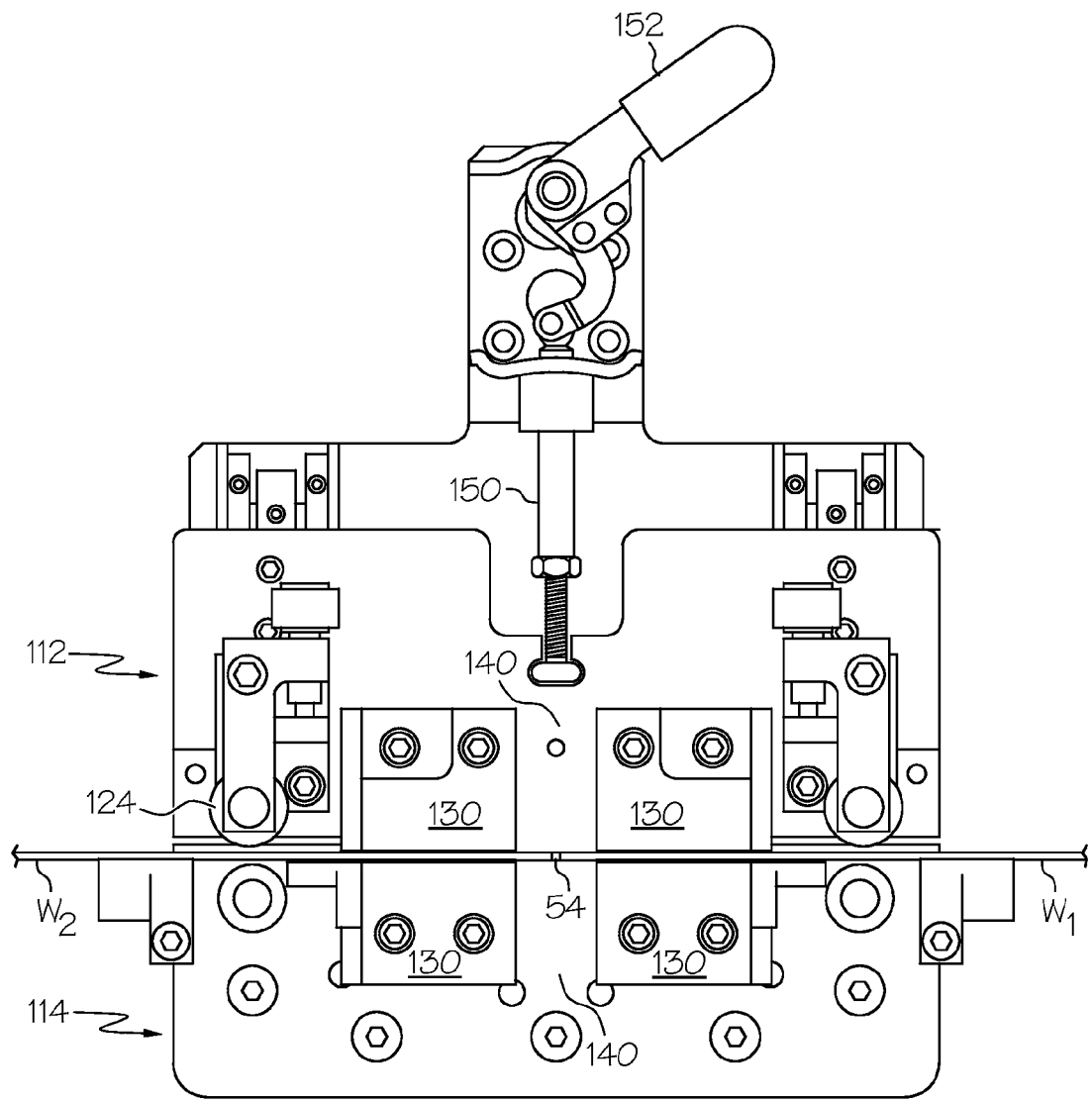
FIG. 12 is a schematic view of exemplary components of the welding unit of FIG. 11 in accordance with the present invention.

Referring generally to the welding unit 100 embodiments of FIGS. 11-12, the welding unit 100 comprises a wire feed tunnel 110 defining a travel path through the welding unit 100 for the first wire source W1 and second wire source W2. The wire feed tunnel 110 may comprises various shapes, dimensions and configurations known to one of ordinary skill in the art. In one embodiment as shown in FIG. 12, the wire feed tunnel defines a substantially circular cross-section configured to engage a cylindrical wire. The welding unit 100 also comprises a pair of wire feed ports 120 disposed on opposite ends of the wire feed tunnel 110. The feed ports 120 define openings in wire feed tunnel, wherein the first W1 and second W2 wire sources are fed. The feed ports 120 may comprise various shapes, dimensions, and configurations known to one skilled in the art. Referring to an embodiment as shown in FIG. 11, the feed port 120 defines a funnel shape with an orifice that tapers inwardly. The funnel shape ensures that the first W1 and second W2 wires are aligned properly when fed through the wire feed tunnel 110. To further ensure proper alignment, the wire feed tunnel 110 may, in a further embodiment, comprise a secondary guide 122 configured to direct the first W1 and second W2 wire sources in the feed tunnel 110. Referring to the embodiment of FIG. 11, the secondary guide 122 is disposed upstream of the feed port 120, and defines a narrower opening than the feed port 120.

Referring generally to FIGS. 11 and 12, the welding unit 100 further comprises a wire joining zone 140 disposed along a portion of the feed tunnel 110. The wire joining zone 140 is configured to weld together an end of the first wire source W1 to an end of the second wire source W2 by applying weld heat to at least part of the respective ends of the first W1 and second W2 wire sources. In operation, the weld heat melts the ends of the wires, and subsequently joins the wires together. It is contemplated that the wire joining zone 140 may be positioned at various positions along the wire feed tunnel 110. In one embodiment, the wire joining zone 140 is located substantially near the center of the wire feed tunnel 110. The wire joining zone 140 may comprise any suitable material operable to provide weld heat to join a first wire W1 to a second wire W2. In one embodiment, the wire joining zone 140 comprises electrically resistive material, for example, ceramic material. In one embodiment, the ceramic material comprise nitride bonded silicon carbide. The weld heat may be generated in the wire joining zone 140 by flowing electric current through the electrically resistive material of the wire joining zone 140. In essence, the resistance to electric current generates the heat.

As shown in FIGS. 11 and 12, the welding unit 100 further comprises a switch 150 configured to adjust the inner diameter of the wire feed tunnel 110 until the inner diameter is substantially the same as the exterior diameter of the first W1 and/or second W2 sources of wire. "Switch", as defined herein, includes any user controlled or automated actuation mechanism operable to adjust the spacing or inner diameter of the wire feed tunnel 100. The switch may 150 may be raised or lowered manually, or through an automated mechanism, for example, a robot. Referring to an embodiment as shown in FIG. 12, the switch 150 comprises a handle 152 used to combine or separate the upper section 112 of the weld unit and the lower section 114 of the welding unit 100, thereby enabling the wire feed tunnel 110 to accommodate wires of varying diameters. In this embodiment, the tunnel opening is defined by the spacing between the upper section 112 and the lower section 114 of the welding unit 100. In operation, it contemplated that the upper section 112, the lower section 114, or both, may be raised or lowered to vary the tunnel 110 spacing. By engaging at least part of the outer diameter of the wire, the wire feed tunnel 110 ensures that the junction 54 of the first W1 and second W2 wire sources does not have a greater diameter than the first W1 or second W2 sources of wire.

Constraining the diameter of the wires ensures that the wires are properly aligned when being joined, and ensures no buff is formed in the junction 54 of the newly created wire. The inner diameter of the zone is substantially the same as the outer diameter of the wire, thus any burr is not provided room for growth during the welding process. In yet another embodiment, the welding unit 100 may further comprise a drain component (not shown) configured to remove any unused or remaining wire materials, for example, molten materials, in the wire feed tunnel 110 after the first W1 and second W2 wire sources have been connected.

In a further embodiment, the welding unit 100 comprises at least one electrical contact block 130 disposed on at least one side of the wire joining zone 140. The electrical contact block 130 is configured to receive electric current from a power source 200 and then provide the current to the wire joining zone 140. As described above, the wire joining zone 140 may convert the current, which is provided by the contact blocks 130, into weld heat via its electrically resistive material. The electrical contact blocks 130 comprise suitable conductive material known to one skilled in the art. In one embodiment, the electrical contact blocks 130 comprise conductive metal, for example, copper.

In yet another embodiment of the welding unit 100, the wire feed tunnel 110 comprises a drive roller 124 configured to move the first W1 and second W2 wire sources into contact with each other inside the wire joining zone 140. In a further embodiment, the welding unit 100 may also comprise a motor 170 configured to move the drive roller 124, thereby facilitating the contact of the first W1 and second W2 wires in the wire joining zone 140. As shown in the embodiment of FIG. 11, the welding unit 100 may further comprise a protective cover 160 configured to act as a shield against weld sparks.

Although the description of the welding unit 100 has focused on the joining of a first W1 and second W2 source of wire, it is further contemplated that the welding unit could be adapted to join more than two wire feeds without departing from the scope of the present invention.

The foregoing description of the various examples and embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the apparatus in accordance with the present invention may comprise bases configured to support any number and size of barrels or other sources of wire in a variety of different arrangements. In addition, the wire joining apparatus may be positioned at a number of locations adjacent base and/or swing arm apparatus. Accordingly, while some of the alternative embodiments of the apparatus have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A welding unit for joining a first and a second source of wire comprising:

a wire feed tunnel defining a travel path through the welding unit for the first and second sources of wire;

a pair of wire feed ports disposed on opposite ends of the wire feed tunnel;

a wire joining zone disposed along a portion of the feed tunnel and configured to weld together an end of the first wire source to an end of the second wire source by applying weld heat to at least part of the respective ends of the first and second wire sources; and a switch configured to adjust an inner diameter of the wire feed tunnel until the inner diameter is substantially the same as an exterior diameter of the first and/or second sources of wire.

2. A welding unit according to claim 1 wherein the wire joining zone is located substantially near the center of wire feed tunnel.

3. A welding unit according to claim 1 wherein the wire joining zone comprises electrically resistive material configured to generate weld heat upon receiving electric current.

4. A welding unit according to claim 1 wherein the wire joining zone comprises ceramic material.

5. A welding unit according to claim 1 wherein the feed ports define funnel shaped openings.

6. A welding unit according to claim 1 wherein the wire feed tunnel comprises a secondary guide configured to direct the first and second wire sources in the feed tunnel.

7. A welding unit according to claim 1 wherein the wire feed tunnel comprises a drive roller configured to move the first and second wire sources toward the wire joining zone.

8. A welding unit according to claim 1 further comprising a motor configured to facilitate contacting of the end portion of the first wire with the end portion of the second wire.

9. A welding unit according to claim 1 further comprising at least one electrical contact block disposed on at least one side of the wire joining zone, wherein the electrical contact block is configured to receive electric current from a power source and provide the current to the wire joining zone.

10. A welding unit according to claim 9 wherein the electrical contact block comprises conductive metal.

11. A welding unit according to claim 9 wherein the electrical contact block comprises copper.

12. A welding unit according to claim 1 further comprising a protective cover being configured to act as a shield against weld sparks.

13. A welding system comprising:

a welding unit according to claim 1;

a power source configured to provide electric current to the welding unit; and a programmable control unit configured to control the welding unit and/or the power source.

14. A welding system according to claim 13 further comprising an auxiliary control unit configured to provide additional control of the welding unit and/or the power source.

15. A welding system according to claim 13 further comprising a wire feeding mechanism operable to provide wire to the feed ports of the welding unit.

16. A welding system according to claim 15 wherein the wire feeding mechanism comprises a robot.

17. A welding system according to claim 13 wherein the programmable control unit comprises a robot, a programmable logic controller, a processor, a computer, or combinations thereof.

18. A method for joining a first welding wire and a second welding wire comprising:

feeding first and second welding wires into opposite ends of a wire feed tunnel in the direction of a wire joining zone such that an end of the first wire contacts an end of the second wire in the wire joining zone;

surrounding at least partially the ends of the first and second weld wires in the wire joining zone; and subsequently applying weld heat to the wire joining zone to weld together the ends of the first and second wires with substantially no burr being formed.

19. A method according to claim 18 further comprising adjusting the wire feed tunnel such that the tunnel defines an interior diameter substantially the same as the exterior diameter of the wires.

20. A method according to claim 18 further comprising generating weld heat by flowing electric current through an electrically resistive material of the wire joining zone.

* * * * *

UNITED STATES PATENT AND TRADEMARK OFFICE
CERTIFICATE OF CORRECTION

| | | |
|---|---|---|
| PATENT NO. | : 7,615,718 B2 | Page 1 of 1 |
| APPLICATION NO. | : 11/397276 | |
| DATED | : November 10, 2009 | |
| INVENTOR(S) | : Steven M. Byerly | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Nineteenth Day of October, 2010

David J. Kappos
*Director of the United States Patent and Trademark Office*